(12) United States Patent
Abou Rjeily

(10) Patent No.: US 8,059,709 B2
(45) Date of Patent: Nov. 15, 2011

(54) SPACE-TIME CODING/DECODING METHOD FOR A DUAL-ANTENNA PULSE UWB COMMUNICATION SYSTEM

(75) Inventor: Chadi Abou Rjeily, Byblos (LB)

(73) Assignee: Commissariat a l'Energie Atomique, Paris (FR)

( * ) Notice: Subject to any disclaimer, the term of this patent is extended or adjusted under 35 U.S.C. 154(b) by 669 days.

(21) Appl. No.: 12/293,666

(22) PCT Filed: Mar. 16, 2007

(86) PCT No.: PCT/EP2007/052493
§ 371 (c)(1),
(2), (4) Date: Oct. 22, 2008

(87) PCT Pub. No.: WO2007/107507
PCT Pub. Date: Sep. 27, 2007

(65) Prior Publication Data
US 2011/0182325 A1    Jul. 28, 2011

(30) Foreign Application Priority Data

Mar. 21, 2006    (FR) .................................... 06 50976

(51) Int. Cl.
*H03K 7/04*    (2006.01)
*H03K 7/06*    (2006.01)
*H03K 9/04*    (2006.01)
*H03K 9/06*    (2006.01)

(52) U.S. Cl. ......... 375/239; 375/256; 375/259; 375/353

(58) Field of Classification Search ................. 375/130, 375/131, 138, 239, 256, 259–260, 353
See application file for complete search history.

(56) References Cited

U.S. PATENT DOCUMENTS

| | | | | |
|---|---|---|---|---|
| 7,289,494 | B2* | 10/2007 | Lakkis | 370/366 |
| 7,321,601 | B2* | 1/2008 | Rogerson et al. | 370/478 |
| 7,379,447 | B2* | 5/2008 | Dunagan et al. | 370/350 |
| 7,594,010 | B2* | 9/2009 | Dohler et al. | 709/224 |
| 7,680,211 | B1* | 3/2010 | von der Embse | 375/299 |
| 7,817,715 | B2* | 10/2010 | Abou Rjeily | 375/239 |

(Continued)

OTHER PUBLICATIONS

Abou-Rjeily et al., "On High Data Rate Space-Time Codes for Ultra-Wideband Systems," IEEE conference on Ultra-Wideband, Sep. 2005.*

(Continued)

*Primary Examiner* — David C. Payne
*Assistant Examiner* — James M Perez
(74) *Attorney, Agent, or Firm* — Pearne & Gordon LLP

(57) ABSTRACT

This invention relates to a space-time coding method for a UWB transmission system comprising two radiation elements. This method codes a block of information symbols ($S=(a_1,a_2,a_3,a_4)$) belonging to a PPM modulation constellation or a PPM-PAM composite modulation constellation with a number of time positions greater than or equal to 3, into a sequence of vectors ($c_1^0, c_2^0, c_1^1, c_2^1$), the components of a vector being intended to modulate a UWB pulse signal for a radiation element of said system and for a given transmission interval ($T_f$). A first and a second of said vectors are obtained by means of a first linear combination of a first and a second pair of said symbols, and a third and a fourth of said vectors are obtained by means of a second linear combination of said first and second pairs of said symbols, the first and the second linear combinations using scalar coefficients ($\alpha, \beta, -\beta, \alpha$) of which the corresponding ratios are approximately equal to the Golden number and to its opposite, the components of one of said vectors also being permuted according to a cyclic permutation prior to modulating said pulse UWB signal.

5 Claims, 5 Drawing Sheets

U.S. PATENT DOCUMENTS 7,864,831 B2 * 1/2011 Abou Rjeily ............... 375/130
2006/0274848 A1 * 12/2006 Champion ................... 375/267

OTHER PUBLICATIONS

Abou-Rjeily et al: "Space-time Coding for Multiuser Ultra-Wideband Communications" [Online] Sep. 13, 2005, XP002407955 http://www.comelec.enst.fr/{belfiore/UWB_MIMO.pdf>.

Belfiore: "The Golden Code: a 1-10 2*2 Full-Rate Space-Time Code with Nonvabishing Determinants" IEEE Transactions on Information Theory, vol. 51, Apr. 2005, XP002407956 http://ieeexplore.ieee.org/ie15/18/305/93/01412035.pdf.
French Search Report.
International Search Report for PCT/EP/2007/052493.

* cited by examiner

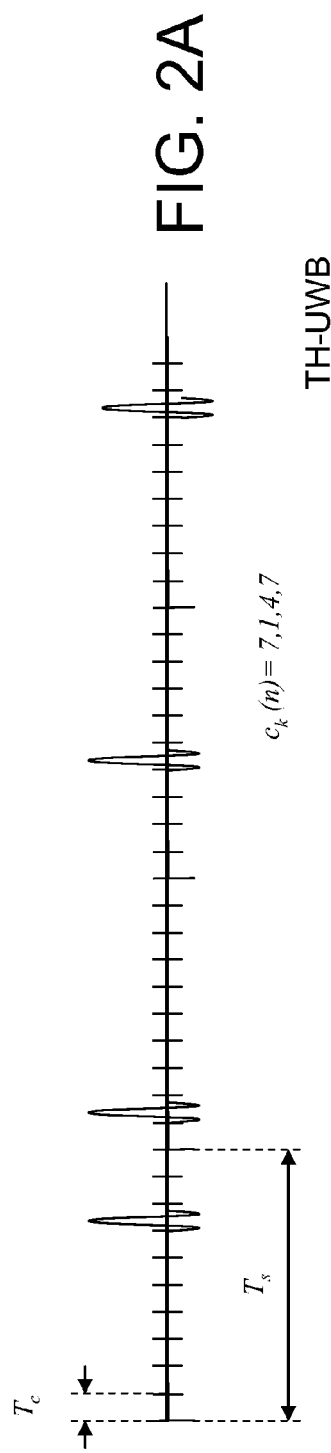
FIG. 2A TH-UWB
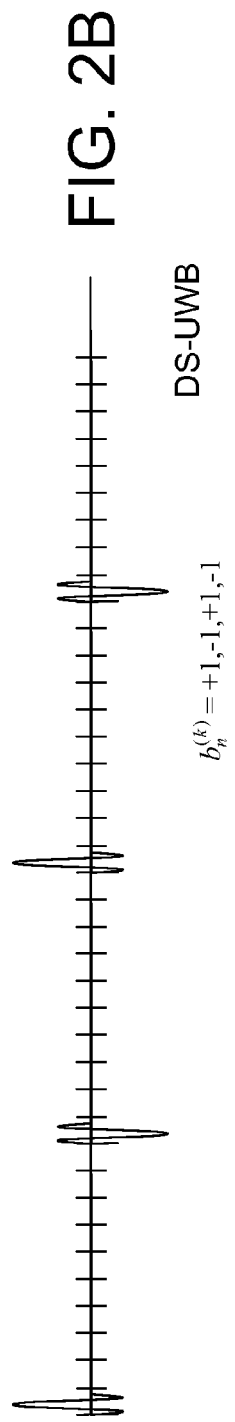
FIG. 2B DS-UWB
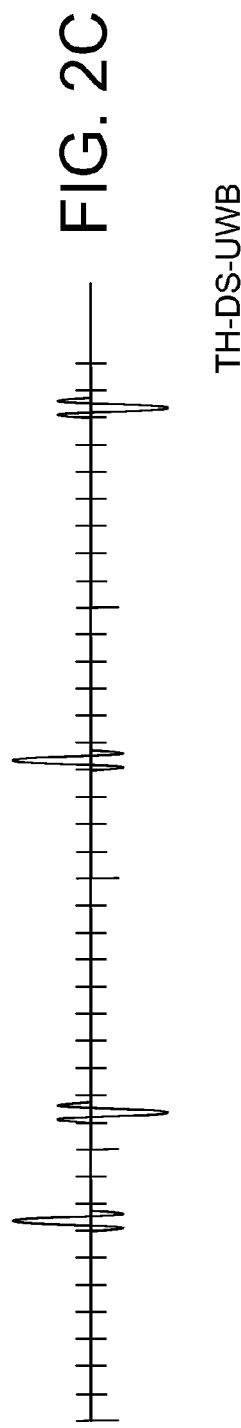
FIG. 2C TH-DS-UWB

SPACE-TIME CODING/DECODING METHOD FOR A DUAL-ANTENNA PULSE UWB COMMUNICATION SYSTEM

TECHNICAL DOMAIN

This invention relates equally to the domain of Ultra Wide Band UWB telecommunications and multi-antenna Space Time Coding (STC) systems.

STATE OF PRIOR ART

Wireless telecommunication systems of the multi-antenna type are well known in the state of the art. These systems use a plurality of emission and/or reception antennas and, depending on the adopted configuration type, are referred to as MIMO (Multiple Input Multiple Output), MISO (Multiple Input Single Output) or SIMO (Single Input Multiple Output). We will subsequently use this term MIMO to cover the above-mentioned MIMO and MISO variants. The use of spatial diversity in emission and/or in reception enables these systems to offer much better channel capacities than conventional single-antenna systems (SISO for Single Input Single Output). This spatial diversity is usually completed by time diversity by means of space-time coding. In such coding, an information symbol to be transmitted is coded on several antennas and at several transmission instants. Two main categories of MIMO systems with space-time coding are known, firstly Space Time Trellis Coding (STTC) systems and Space Time Block Coding (STBC) systems. In a trellis coding system, the space-time encoder may be seen as a finite state machine supplying P transmission symbols to P antennas as a function of the current state and the information symbol to be coded. Decoding on reception is done by a multi-dimensional Viterbi algorithm for which the complexity increases exponentially as a function of the number of states. In a block coding system, an information symbol block to be transmitted is coded in a transmission symbol matrix, one dimension of the matrix corresponding to the number of antennas and the other corresponding to consecutive transmission instants.

FIG. 1 diagrammatically shows a MIMO transmission system 100 with STBC coding. An information symbol block $s=(a_1, \ldots, a_b)$, for example a binary word with b bits or more generally b M-ary symbols, is coded as a space-time matrix:

$$C = \begin{pmatrix} c_{1,1} & c_{1,2} & \ldots & c_{1,P} \\ c_{2,1} & c_{2,2} & \ldots & c_{2,P} \\ \vdots & \vdots & \ddots & \vdots \\ c_{T,1} & c_{T,2} & \ldots & c_{T,P} \end{pmatrix} \quad (1)$$

in which the coefficients $c_{t,p}$, $t=1,\ldots,T$; $p=1,\ldots,P$ of the code are usually complex coefficients depending on information symbols, P is the number of antennas used for the emission, T is an integer number indicating the time extension of the code, in other words the number of channel use instants or PCUs (Per Channel Use).

The function $f$ that makes an information symbol vector S to correspond to a space-time code word C is called the coding function. If the function $f$ is linear, the space-time code is said to be linear. If the coefficients $c_{t,p}$ are real, the space-time code is said to be real.

In FIG. 1, a space-time encoder is denoted 110. At each channel use instant t, the encoder provides the multiplexer 120 with the t-th row vector of the matrix C. The multiplexer transmits the coefficients of the row vector to the modulators $130_1, \ldots, 130_P$ and the modulated signals are transmitted by the antennas $140_1, \ldots, 140_P$.

The space-time code is characterized by its rate, in other words by the number of information symbols that it transmits per channel use (PCU). The code is said to be at full rate if it is P times higher than the rate relative to a single antenna use (SISO).

The space-time code is also characterized by its diversity which can be defined as the rank of the matrix C. There will be a maximum diversity if the matrix $C_1$-$C_2$ is full rank for two arbitrary code words $C_1$ and $C_2$ corresponding to two vectors $S_1$ and $S_2$.

Finally, the space-time code is characterized by its coding gain that gives the minimum distance between different code words. It can be defined as follows:

$$\min_{C_1 \neq C_2} \det((C_1 - C_2)^H(C_1 - C_2)) \quad (2)$$

or, equivalently, for a linear code:

$$\min_{C \neq 0} \det(C^H C) \quad (3)$$

where det(C) refers to the determinant of C and $C^H$ is the conjugate transpose matrix of C. The code gain for a given transmission energy per information symbol, is bounded.

A space-time code will be all the more resistant to vanishing as its coding gain is high.

One of the first examples of space-time coding for a MIMO system with two transmission antennas was proposed in the article by J-C Belfiore et al entitled <<The Golden code: a 2×2 full-rate space-time code with non-vanishing determinants>>, published in the IEEE Transactions on Information Theory, vol. 51, No. 4, pages 1432-1436, April 2005.

The proposed code, called the Golden code, is based on a double algebraic extension K of the field of rational numbers Q: $K=Q(i,\theta)$ where $i=\sqrt{-1}$ is the root of the polynomial $X^2+1$ and $\theta$ is the Golden number $$\theta = \frac{1+\sqrt{5}}{2},$$

root of the polynomial $X^2-X-1$. The Golden code can be represented by the following matrix:

$$C_{gold} = \begin{pmatrix} \alpha(a_1 + \theta a_2) & \alpha(a_3 + \theta a_4) \\ i\alpha_1(a_3 + \theta_1 a_4) & \alpha_1(a_1 + \theta_1 a_2) \end{pmatrix} \quad (4)$$

where $S=(a_1,a_2,a_3,a_4)$ is a vector of information symbols. $a_1,a_2,a_3,a_4$ are complex symbols of a constellation $2^b$-QAM, sub-set of Z[i] where Z is the ring of integers.

$$\theta_1 = \frac{1+\sqrt{5}}{2}$$

is the conjugated root of $\theta$, $\alpha=1+i(1-\theta))$ and $\alpha_1=1+i(1-\theta_1)$.

The Golden code has the advantage of having maximum diversity and full rate in the sense defined above. It also has the highest coding gain that has been obtained so far.

Considerable research is now being carried out in another telecommunications domain, namely UWB telecommunication systems that are particularly promising for the development of future wireless personal networks (WPAN). These systems are specific in that they directly operate in baseband with ultra wide band signals. A UWB signal usually means a signal conforming with the spectral mask stipulated in the FCC Feb. 14, 2002 regulations revised March 2005, in other words essentially a signal in the spectral band from 3.1 to 10.6 GHz and with a bandwidth of at least 500 MHz at −10 dB. In practice, two types of UWB signals are known, multi-band OFDM (MB-OFDM) signals and UWB pulse signals. We will be interested only in UWB pulse signals in the following description.

A pulse UWB signal is composed of very short pulses, typically of the order of a few hundred picoseconds distributed within a frame. A distinct Time Hopping (TH) code is assigned to each user, to reduce Multiple Access Interference (MAI). The signal output from or destined to a user k can then be written in the following form:

$$s_k(t) = \sum_{n=0}^{N_s-1} w(t - nT_s - c_k(n)T_c) \quad (5)$$

where w is the shape of the elementary pulse, $T_c$ is a chip duration, $T_s$ is the duration of an elementary interval with $N_s=N_cT_c$, where $N_c$ is the number of chips in an interval, the total frame duration being $T_f=N_sT_s$ where $N_c$ is the number of intervals in the frame. The duration of the elementary pulse is chosen to be less than the chip duration, namely $T_w \leq T_c$. The sequence $c_k(n)$ for $n=0, \ldots, N_s-1$ defines the time hopping code of the user k. Time hopping sequences are chosen to minimize the number of collisions between pulses belonging to time hopping sequences of different users.

FIG. 2A shows a TH-UWB signal associated with a user k. Usually the TH-UWB signal is modulated by PPM (Pulse Position Modulation) so as to transmit a given information symbol from or to a user k, namely the modulated signal can be expressed as:

$$s_k(t) = \sum_{n=0}^{N_s-1} w(t - nT_s - c_k(n)T_c - d_k\varepsilon) \quad (6)$$

where $\varepsilon$ is a dither significantly smaller than the chip duration $T_c$ and $d_k \in \{0, \ldots, M-1\}$ is the M-ary PPM position of the symbol.

Alternately, information symbols can be transmitted using an amplitude modulation (PAM). In this case, the modulated signal can be written as follows:

$$s_k(t) = \sum_{n=0}^{N_s-1} a^{(k)} \cdot w(t - nT_s - c_k(n)T_c) \quad (7)$$

in which $a^{(k)}=2m'-1-M'$ where $m'=1, \ldots, M'$, and $a^{(k)}$ is the M-ary symbol of the PAM modulation. For example, we could use a BPSK modulation (M'=2).

The PPM and PAM modulations can also be combined into a composite M.M'-ary modulation. The general expression of the modulated signal is then as follows:

$$s_k(t) = \sum_{n=0}^{N_s-1} \sum_{m=0}^{M-1} a_m^{(k)} \cdot w(t - nT_s - c_k(n)T_c - m\varepsilon) \quad (8)$$

The alphabet for this modulation of cardinal M.M' is shown in FIG. 3. There are M' possible modulation amplitudes for each of the M temporal positions. A symbol (d,a) of the alphabet can be represented by a sequence $a_m$, $m=0, \ldots, M-1$ in which $a_m=\delta(m-d)a$ and d is a position of the PPM modulation, a is a PAM modulation amplitude and $\delta(.)$ is the Dirac distribution.

Instead of separating different users by time hopping codes, it is also possible to separate them by orthogonal codes, for example Hadamard codes as in DS-CDMA. We then talk about DS-UWB (Direct Spread UWB). In this case, we obtain the following expression for the unmodulated signal corresponding to (5):

$$s_k(t) = \sum_{n=0}^{N_s-1} b_n^{(k)} w(t - nT_s) \quad (9)$$

where $b_n^{(k)}$, $n=0, \ldots, N_s-1$ is the spreading sequence for the user k. Note that the expression (9) is similar to the expression of a conventional DS-CDMA signal. However, it differs in the fact that the chips do not occupy the entire frame, but are distributed at period $T_s$. FIG. 2B shows a DS-UWB signal associated with a user k.

As before, the information symbols may be transmitted using a PPM modulation, a PAM modulation or a composite PPM-PAM modulation. The amplitude modulated DS-UWB signal (7) corresponding to the TH-AWB signal (7) may be expressed as follows, using the same notation:

$$s_k(t) = \sum_{n=0}^{N_s-1} a^{(k)} b_n^{(k)} \cdot w(t - nT_s) \quad (10)$$

Finally, it is known that time hops and spectral spreading codes can be combined to offer multiple access to the different users. The result is thus a TH-DS-UWB pulse UWB signal with the following general form:

$$s_k(t) = \sum_{n=0}^{N_s-1} b_n^{(k)} \cdot w(t - nT_s - c_k(n)T_c) \quad (11)$$

FIG. 2C shows a TH-DS-UWB signal associated with a user k. This signal may be modulated by an M.M'-ary PPM-PAM composite modulation. The result for the modulated signal is then the following:

$$s_k(t) = \sum_{n=0}^{N_s-1} \sum_{m=0}^{M-1} a_m^{(k)} b_n^{(k)} \cdot w(t - nT_s - c_k(n)T_c - m\varepsilon) \quad (12)$$

It is known from the state-of-the-art to use UWB signals in MIMO systems. In this case, each antenna transmits a UWB signal modulated as a function of an information symbol or a block of such symbols (STBC).

Space-time coding techniques initially developed for narrow band signals or for DS-CDMA are not suitable for pulse UWB signals. Indeed, known space-time codes such as the Golden code usually have complex coefficients and consequently carry phase information. It is extremely difficult to retrieve this phase information in a signal with a band as wide as the band of pulse UWB signals. The very narrow pulse time support is much more suitable for a position (PPM) or amplitude (PAM) modulation.

A space-time code for UWB signals has been proposed in the article by Chadi Abou-Rjeily et al. entitled <<Space-Time coding for multi-user Ultra-Wideband communications>>submitted for publication in IEEE Transactions on Communications, September 2005 and available at www.tsi.enst.fr.

In accordance with the constraints mentioned above, the proposed space-time code is real. For example, for a configuration with two transmitting antennas, the code can be written as follows:

$$C = \begin{pmatrix} \beta(a_1 + \theta a_2) & \sqrt{2}\beta(a_3 + \theta a_4) \\ \sqrt{2}\beta_1(a_3 + \theta_1 a_4) & \beta_1(a_1 + \theta_1 a_2) \end{pmatrix} \quad (13)$$

where $$\beta = \frac{1}{\sqrt{1+\theta^2}} \text{ and } \beta_1 = \frac{1}{\sqrt{1+\theta_1^2}};$$

$S=(a_1,a_2,a_3,a_4)$ is a vector of PAM information symbols, namely $a_i \in \{-M'+1, \ldots, M'-1\}$.

The same article suggests how this space-time code can be generalized for coding a block of information symbols belonging to a PPM-PAM alphabet. For a configuration with two transmission antennas, this code can be expressed by a matrix with size $2M \times 2$:

$$C = \begin{pmatrix} \beta(a_{1,0} + \theta a_{2,0}) & \sqrt{2}\beta(a_{3,0} + \theta a_{4,0}) \\ \vdots & \vdots \\ \beta(a_{1,M-1} + \theta a_{2,M-1}) & \sqrt{2}\beta(a_{3,M-1} + \theta a_{4,M-1}) \\ \sqrt{2}\beta_1(a_{3,0} + \theta_1 a_{4,0}) & \beta_1(a_{1,0} + \theta_1 a_{2,0}) \\ \vdots & \vdots \\ \sqrt{2}\beta_1(a_{3,M-1} + \theta_1 a_{4,M-1}) & \beta_1(a_{1,M-1} + \theta_1 a_{2,M-1}) \end{pmatrix} \quad (14)$$

Here, each information symbol $a_i=(a_{i,0}, \ldots, a_{i,M-1})$ is a vector representing an element of the PPM-PAM alphabet where $a_{i,m}=a_i\delta(m-d_i)$, and where $a_i$ is an element of the PAM alphabet and $d_i$ is an element of the PPM alphabet. Therefore, the block of information symbols coded using the code C is simply $S=(a_1,a_2,a_3,a_4)$.

More precisely, the block of information symbols S generates UWB signals according to the expressions given further below. To simplify the notation, we have assumed use by a single user (no indexing by k, and hence no spreading sequence).

Antenna 1 transmits the following signal during the first frame $T_f$:

$$s^1(t) = \beta \sum_{n=0}^{N_s-1} \sum_{m=0}^{M-1} (a_{1,m} + \theta a_{2,m})w(t - nT_s - c(n)T_c - m\varepsilon) \quad (15)$$

this signal corresponds to the first column vector of the first M rows of the code (14).

Antenna 2 simultaneously transmits the following signal during the first frame $T_f$:

$$s^2(t) = \beta\sqrt{2} \sum_{n=0}^{N_s-1} \sum_{m=0}^{M-1} (a_{3,m} + \theta a_{4,m})w(t - nT_s - c(n)T_c - m\varepsilon) \quad (16)$$

this signal corresponds to the second column vector of the first M rows of the code.

Antenna 1 then transmits the following signal during the second frame, once again taking account of the time origin at the beginning of the frame:

$$s^1(t) = \beta_1\sqrt{2} \sum_{n=0}^{N_s-1} \sum_{m=0}^{M-1} (a_{3,m} + \theta a_{4,m})w(t - nT_s - c(n)T_c - m\varepsilon) \quad (17)$$

this signal corresponds to the first column vector of the last M rows of the code.

Finally, antenna 2 simultaneously transmits the following signal during the second frame:

$$s^2(t) = \beta_1 \sum_{n=0}^{N_s-1} \sum_{m=0}^{M-1} (a_{1,m} + \theta a_{2,m})w(t - nT_s - c(n)T_c - m\varepsilon) \quad (18)$$

this signal corresponds to the second column vector of the last M rows of the code.

The space-time code defined above has very good performances in terms of diversity. However, its coding gain is lower than the coding gain of the Golden code defined in (4). Furthermore, the scalar term $\sqrt{2}$ appearing in the matrix (14) creates an energy unbalance between the antennas in each frame.

The purpose of this invention is to propose a space-real time code for a MIMO system with pulse UWB signals that has a higher gain than known codes for such systems, and particularly the code defined by (14). A second purpose of this invention is to propose a space-time code with a balanced energy distribution between the antennas in each frame.

PRESENTATION OF THE INVENTION

This invention is defined by a space-time coding method for a UWB transmission system comprising two radiation elements, said method coding a block of information symbols ($S=(a_1,a_2,a_3,a_4)$) belonging to a PPM modulation constellation or a PPM-PAM composite modulation constellation with a number of time positions greater than or equal to 3, into a sequence of vectors ($c_1^0, c_2^0, c_1^1, c_2^1$), components of a vector being intended to modulate a UWB pulse signal for a radiation element of said system and for a given transmission interval ($T_f$). According to this method, a first and a second of said vectors are obtained by means of a first linear combination of a first and a second pair of said symbols, and a third and a fourth of said vectors are obtained by means of a second linear combination of said first and second pairs of said symbols, the first and second linear combinations using scalar coefficients ($\tilde{\alpha}$, $\tilde{\beta}$, $-\tilde{\beta}$, $\tilde{\alpha}$), the corresponding ratios of which are approximately equal to the Golden number and to its opposite, the components of one of said vectors also being permuted according to a cyclic permutation before said pulse UWB signal is modulated.

This invention is also defined by a space-time coding system to implement said method. To do this, the system comprises:
input memory elements to store four information symbols, each information symbol being composed of M components where $M \geq 3$, where each component can take M' possible values with $M' \geq 1$;
a first plurality of first modules each receiving a component of a first information symbol and a component of the same rank of a second information symbol, each module performing said first and second linear combinations of said components to provide a first and a second output value;
a second plurality of second modules, each receiving a component of a third information symbol and a component of the same rank of a fourth information symbol, each module performing said first and second linear combinations of said components to provide a first and a second output value;
output memory elements to store the first and second output values of the first and second modules respectively;
means for permuting write or read addresses of one of the output elements according to a cyclic permutation of order M.

BRIEF DESCRIPTION OF THE DRAWINGS

Other characteristics and advantages of the invention will become clear after reading a preferred embodiment of the invention with reference to the attached figures among which:
FIGS. 2A to 2C show the corresponding shapes of TH-UWB, DS-UWB and TH-DS-UWB signals.

DETAILED PRESENTATION OF PARTICULAR EMBODIMENTS

Figure 1:
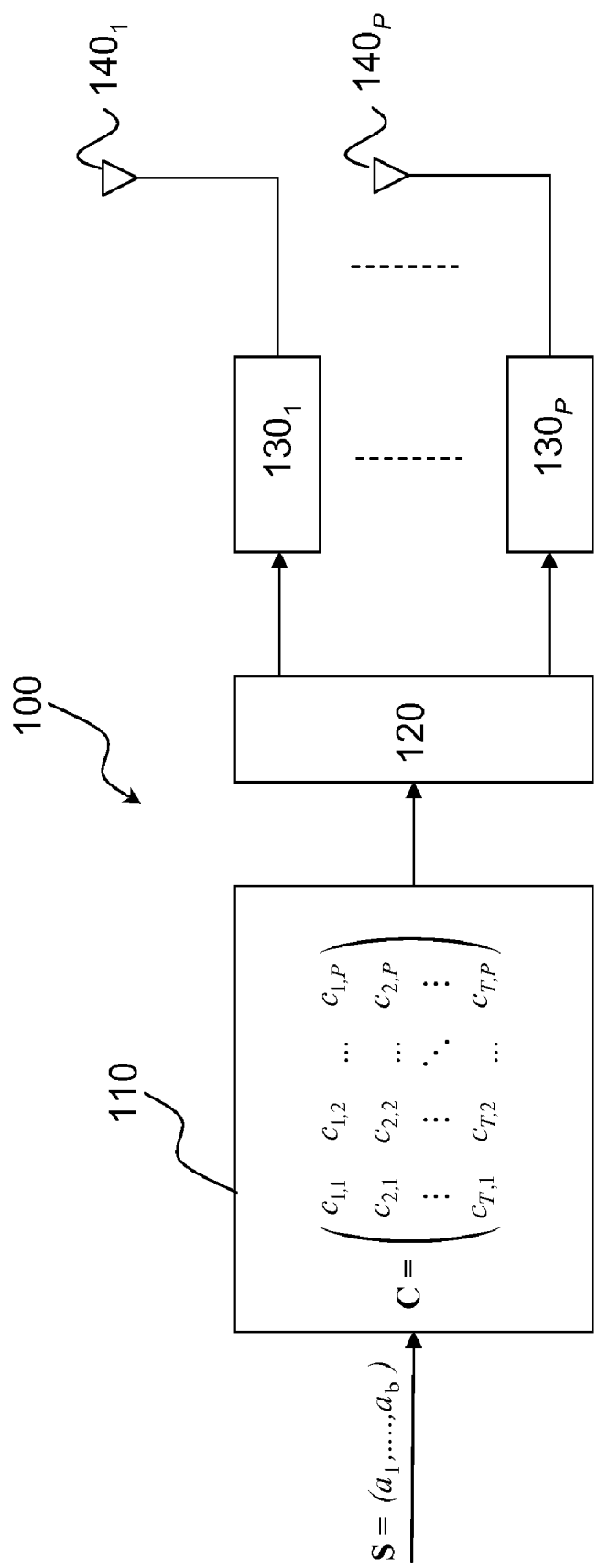
FIG. 1 diagrammatically represents a MIMO transmission system with STBC coding known in the state of the art.

The basic concept of the invention is to create a space-time code not requiring the use of complex values $\alpha$ and $\alpha_1$ appearing in the Golden code (4), that, as has been mentioned, are incompatible with the use of pulse UWB signals, and without the $\sqrt{2}$ scalar values appearing in codes (13) and (14), at the origin of an unbalanced distribution of energy on the antennas.

The disclosed space-time code is applicable to MIMO systems with two transmission antennas using pulse UWB signals in which information symbols are modulated using a PPM-PAM modulation where $M \geq 3$, and where M as defined above is the cardinal of the PPM modulation. The man skilled in the art will clearly understand that this type of modulation includes in particular PPM modulations with $M \geq 3$. The proposed code is represented by the $2M \times 2$ size matrix, where M is the cardinal of the PPM modulation as above:

$$C = \begin{pmatrix} \tilde{\alpha}a_1 + \tilde{\beta}a_2 & \tilde{\alpha}a_3 + \tilde{\beta}a_4 \\ \Omega(-\tilde{\beta}a_3 + \tilde{\alpha}a_4) & -\tilde{\beta}a_1 + \tilde{\alpha}a_2 \end{pmatrix} \quad (19)$$

where $$\tilde{\alpha} = \frac{1}{\sqrt{1+\theta^2}}; \quad \tilde{\beta} = \frac{\theta}{\sqrt{1+\theta^2}}; \quad \theta = \frac{1+\sqrt{5}}{2};$$

$a_i = (a_{i,0}, \ldots, a_{i,M-1})$ being information symbols as above and $\Omega$ is a cyclic permutation matrix with size $M \times M$. For example, $\Omega$ is a simple circular shift:

$$\Omega = \begin{pmatrix} 0_{1 \times M-1} & 1 \\ I_{M-1 \times M-1} & 0_{M-1 \times 1} \end{pmatrix} = \begin{pmatrix} 0 & 0 & \ldots & 0 & 1 \\ 1 & 0 & \ldots & 0 & 0 \\ 0 & 1 & 0 & \ddots & \vdots \\ \vdots & \ddots & \ddots & \ddots & 0 \\ 0 & \ldots & 0 & 1 & 0 \end{pmatrix} \quad (20)$$

where $I_{M-1 \times M-1}$ is the unit matrix size $M-1$, $0_{1 \times M-1}$ is the null row vector with size $M-1$, $0_{M-1 \times 1}$ is the null column vector with size $M-1$.

As can be seen, the matrix C is real and there is no asymmetric weighting depending on the antennas. It can be written more explicitly:

$$C = \begin{pmatrix} \tilde{\alpha}a_{1,0} + \tilde{\beta}a_{2,0} & \tilde{\alpha}a_{3,0} + \tilde{\beta}a_{4,0} \\ \tilde{\alpha}a_{1,1} + \tilde{\beta}a_{2,1} & \tilde{\alpha}a_{3,1} + \tilde{\beta}a_{4,1} \\ \vdots & \vdots \\ \tilde{\alpha}a_{1,M-1} + \tilde{\beta}a_{2,M-1} & \tilde{\alpha}a_{3,M-1} + \tilde{\beta}a_{4,M-1} \\ -\tilde{\beta}a_{3,M-1} + \tilde{\alpha}a_{4,M-1} & -\tilde{\beta}a_{1,0} + \tilde{\alpha}a_{2,0} \\ -\tilde{\beta}a_{3,0} + \tilde{\alpha}a_{4,0} & -\tilde{\beta}a_{1,1} + \tilde{\alpha}a_{2,1} \\ \vdots & \vdots \\ -\tilde{\beta}a_{3,M-2} + \tilde{\alpha}a_{4,M-2} & -\tilde{\beta}a_{1,M-1} + \tilde{\alpha}a_{2,M-1} \end{pmatrix} \quad (21)$$

Figure 3:
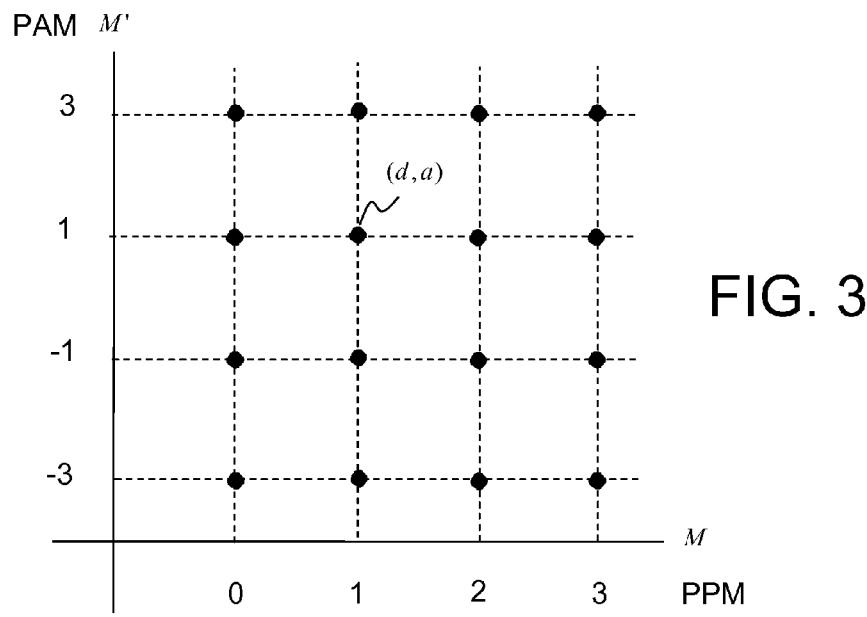
FIG. 3 shows an example constellation of a PPM-PAM modulation.

Expression (21) shows that the effect of multiplication by the matrix $\Omega$ results in a cyclic permutation on the first column vector of the last M rows of the matrix C. Thus, although the chronological order of the PPM positions during the first frame (first M rows of C) is identical for both antennas, the PPM positions relative to the $a_3, a_4$ symbols for the second frame (last M rows of C) are circularly permuted with respect to the PPM positions of symbols $a_1, a_2$. In the example given, cyclic permutation is a simple circular shift. In other words, everything takes place as if the PPM-PAM constellation of symbols $a_3, a_4$ as shown in FIG. 3 had been cyclically rotated by one position towards the right, during the second frame.

In general, the matrix $\Omega$ is a cyclic permutation matrix of order M. When $M \geq 3$, this matrix cannot be reduced to a simple transposition. Expressions (15) to (18) giving UWB signals generated by the two antennas during the first and second frames, should then be replaced by expressions (21) to (24) given below:

First Frame:

$$s^1(t) = \sum_{n=0}^{N_s-1} \sum_{m=0}^{M-1} (\tilde{\alpha} a_{1,m} + \tilde{\beta} a_{2,m}) w(t - nT_s - c(n)T_c - m\varepsilon) \quad (21)$$

$$s^2(t) = \sum_{n=0}^{N_s-1} \sum_{m=0}^{M-1} (\tilde{\alpha} a_{3,m} + \tilde{\beta} a_{4,m}) w(t - nT_s - c(n)T_c - m\varepsilon) \quad (22)$$

Second Frame:

$$s^1(t) = \sum_{n=0}^{N_s-1} \sum_{m=0}^{M-1} (-\tilde{\beta} a_{3,\sigma(m)} + \tilde{\alpha} a_{4,\sigma(m)}) w(t - nT_s - c(n)T_c - m\varepsilon) \quad (23)$$

$$s^2(t) = \sum_{n=0}^{N_s-1} \sum_{m=0}^{M-1} (-\tilde{\beta} a_{1,m} + \tilde{\alpha} a_{2,m}) w(t - nT_s - c(n)T_c - m\varepsilon) \quad (24)$$

where $\sigma$ is a cyclic permutation of the set $\{0,1,\ldots,M-1\}$.

The matrix $\Omega$ of the proposed code may be a cyclic permutation associated with a sign change of any one or a plurality of its elements. In the case of the example given in (20), the matrices:

$$\Omega = \begin{pmatrix} 0 & 0 & \cdots & 0 & \chi_0 \\ \chi_1 & 0 & \cdots & 0 & 0 \\ 0 & \chi_2 & 0 & \ddots & \vdots \\ \vdots & \ddots & \ddots & \ddots & 0 \\ 0 & \cdots & 0 & \chi_{M-1} & 0 \end{pmatrix} \quad (25)$$

Where $\chi_i = \pm 1$, may also be used in the C code according to the invention. It will be noted that cyclic permutation associated with a sign inversion is equivalent to making a cyclic rotation on the positions and symmetry with respect to the zero amplitude axis of the PAM constellation for the positions concerned by this inversion, in the PPM-PAM constellation (see FIG. 3).

The following variants could also be used as an alternative to the space-time code defined by (19):

$$C = \begin{pmatrix} -\tilde{\beta} a_1 + \tilde{\alpha} a_2 & \tilde{\alpha} a_3 + \tilde{\beta} a_4 \\ \Omega(-\tilde{\beta} a_3 + \tilde{\alpha} a_4) & \tilde{\alpha} a_1 + \tilde{\beta} a_2 \end{pmatrix} \quad (26)$$

$$C = \begin{pmatrix} \tilde{\alpha} a_1 + \tilde{\beta} a_2 & \Omega(-\tilde{\beta} a_3 + \tilde{\alpha} a_4) \\ \tilde{\alpha} a_3 + \tilde{\beta} a_4 & -\tilde{\beta} a_1 + \tilde{\alpha} a_2 \end{pmatrix} \quad (27)$$

$$C = \begin{pmatrix} -\tilde{\beta} a_1 + \tilde{\alpha} a_2 & \Omega(-\tilde{\beta} a_3 + \tilde{\alpha} a_4) \\ \tilde{\alpha} a_3 + \tilde{\beta} a_4 & \tilde{\alpha} a_1 + \tilde{\beta} a_2 \end{pmatrix} \quad (28)$$

these variants being obtained by permutation of the diagonal and/or anti-diagonal column vectors M×1 of (19).

Obviously, for matrices (26),(27),(28), the matrix $\Omega$ may have the same variants as are envisaged for (19), namely a cyclic permutation that may or may not be associated with a sign inversion of one or a plurality of its elements.

It is also important to note that, regardless of the envisaged form of the code (19),(26),(27),(28), any permutation on the indexes of the $a_i$ symbols is again a space-time code according to the invention, because such a permutation amounts to a simple time rearrangement within the block $S=(a_1,a_2,a_3,a_4)$.

Finally, the ratio between the $\tilde{\alpha}$ and $\tilde{\beta}$ coefficients of the matrix C is equal to the Golden number and is such that $\tilde{\alpha}^2+\tilde{\beta}^2=1$ (energy gain equal to 1). It is clear that in keeping this value of the ratio, homothetic values of $\tilde{\alpha}$ and $\tilde{\beta}$ will also lead to a space-time code according to the invention. In practice, the $\tilde{\alpha}$ and $\tilde{\beta}$ coefficients are quantized in digital form, which gives a slightly different ratio from the Golden number. It can be shown that a difference in this ratio equal to ±10% around the Golden number would not significantly affect the performances of the space-time code. In the following, when we refer to a ratio substantially equal to the Golden number, we mean a ratio within this variation range.

Regardless of the envisaged form of the code (19), (26), (27),(28), this code makes it possible to transmit four information symbols on two antennas for two uses of the channel. Consequently, it operates at full speed. It could also be shown that the code has maximum diversity for M≧3, ∀M'≧1 and that furthermore, the coding gain is optimum in the following cases:

(a) M'=1 and M≧3, in other words for the 3-PPM, 4-PPM modulations etc.

(b) M≧4, ∀M'≧1.

Figure 4:
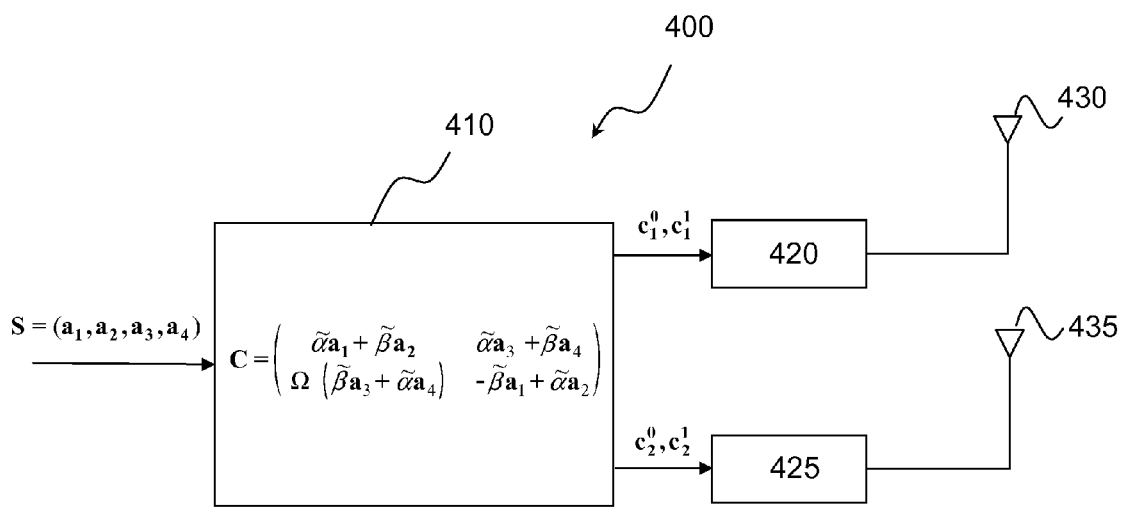
FIG. 4 diagrammatically shows a MIMO transmission system using the space-time coding according to the invention.

FIG. 4 shows an example of a transmission system using the space-time coding according to the invention.

The system 400 receives information symbols by block $S=(a_1,a_2,a_3,a_4)$ where values $a_i$ are symbols of a PPM-PAM constellation. Alternately, the information symbols may originate from another M.M'-ary constellation provided that they are mapped into symbols of the PPM-PAM constellation. Obviously, information symbols may originate from one or a plurality of operations well known to those skilled in the art such as source coding, convolution type channel coding, block coding or even serial or parallel turbocoding, interleaving, etc.

The information symbols block is then subjected to a coding operation in the space-time encoder 410. More precisely, the module 410 calculates the coefficients of the matrix C according one of the expressions (14),(26),(27),(28) or variants thereof. The two column vectors $c_1^0, c_2^0$ composed of the first M rows of C are transmitted to the UWB modulators 420 and 425 respectively for the first frame, and then the two column vectors $c_1^1, c_2^1$ composed of the M last rows of C, for the second frame. The upper index indicates here the frame and the lower index indicates the radiating element 430 or 435. The UWB modulator 420 generates the corresponding modulated UWB pulse signals from the vectors $c_1^0, c_1^1$. Similarly, the UWB modulator 425 generates the corresponding modulated UWB pulse signals from the $c_2^0, c_2^1$ vectors. For example, if the space-time coding matrix (19) is used as shown in the figure, the UWB modulator 420 will provide the signals (21) and (23) one after the other while the UWB modulator 425 will provide the signals (22) and (24) one after the other. In general, the pulse UWB signals acting as a support for the modulation may be of the TH-UWB, DS-UWB or TH-DS-UWB type. The pulse UWB signals thus modulated are then forwarded to the radiation elements 430 and 435. These radiation elements may be UWB antennas or laser diodes (LEDs), for example operating in the infrared range, associated with electro-optic modulators. The proposed transmission system can then be used for wireless optical telecommunications purposes.

Figure 5:
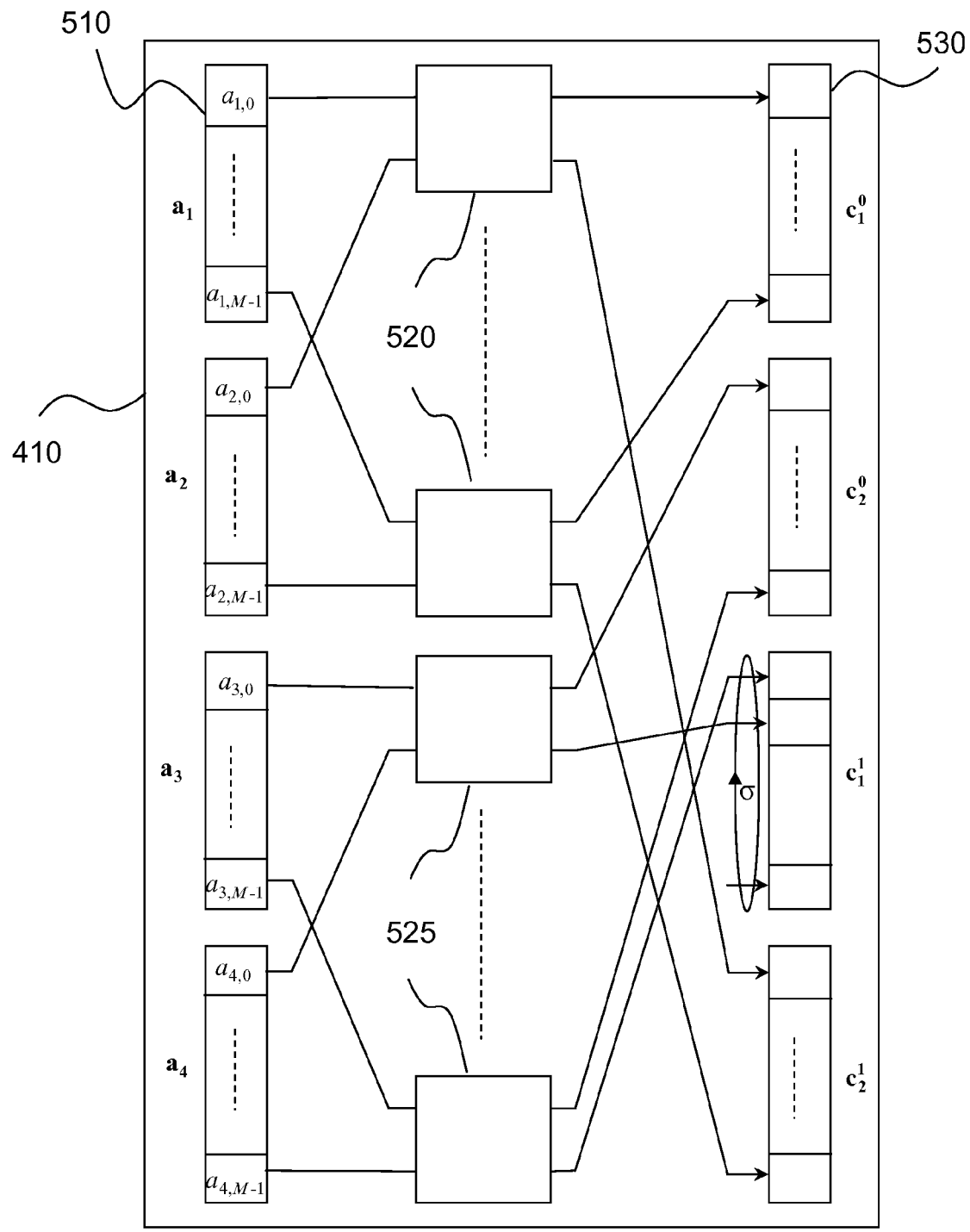
FIG. 5 diagrammatically shows the structure of a space-time encoder according to one embodiment of the invention.

FIG. 5 shows an advantageous embodiment of the space-time encoder 410 in FIG. 4. The encoder uses an elementary module 520 or 525 with two inputs and two outputs performing the following linear operation:

$$X = \tilde{\alpha}x + \tilde{\beta}y$$

$$Y = -\tilde{\beta}x + \tilde{\alpha}y \quad (29)$$

in which all values are scalar; x,y are input values and X,Y are output values.

Figure 6:
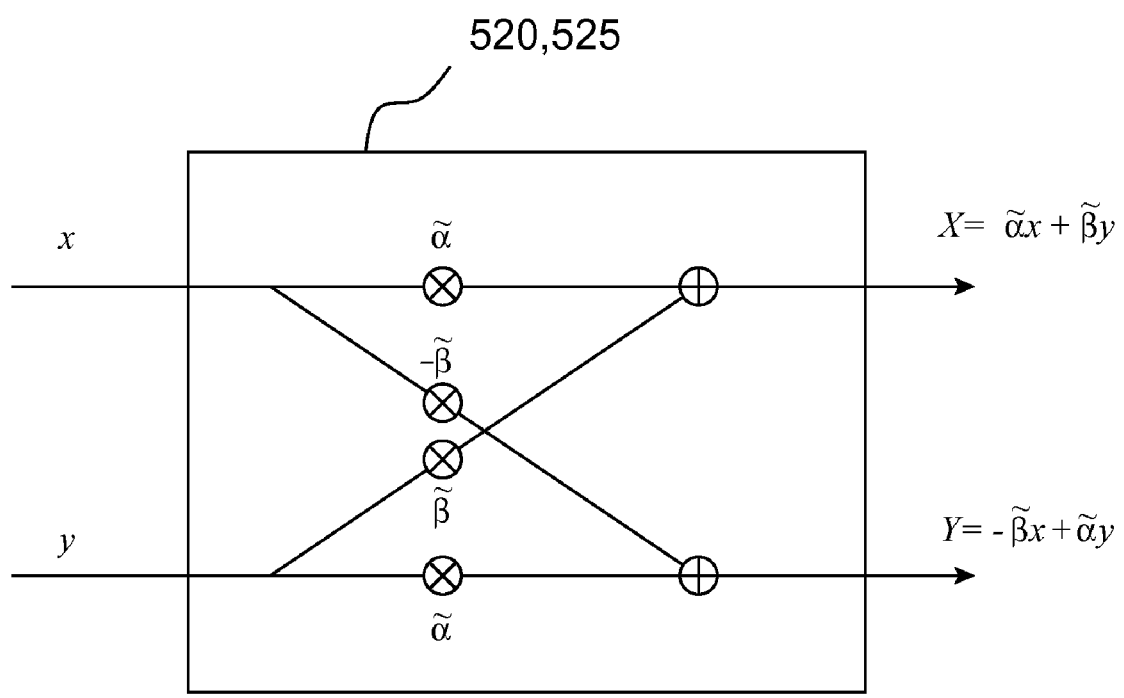
FIG. 6 diagrammatically shows the structure of an elementary module useful for implementing the space-time encoder in FIG. 5.

An example module 520, 525 is shown diagrammatically in FIG. 6. The modules 520, 525 may be composed of multipliers and adders wired as indicated or made using microsequenced operations.

The space-time encoder comprises a number 2M of such elementary modules operating in parallel. According to one variant embodiment not shown, the space-time encoder may also simply contain a sub-multiple of these 2M modules, the data presented in input and the data supplied in output then being multiplexed and demultiplexed respectively in time.

Components of vectors $a_1, a_2, a_3, a_4$ are stored in input in the buffers 510. Elementary modules 520 performing the operation (29) on the M components of the vectors $a_1, a_2$ and the elementary modules 525 perform the same operation on the components of vectors $a_3, a_4$.

Column vectors $c_1^0, c_2^0$ and $c_1^1, c_2^1$ related to the first and second frame respectively are stored in the output buffers 530.

FIG. 5 shows the case in which the space-time coding is in the form (19). The values X and Y at the output from the elementary modules 520 are written in the buffers 530 of $c_1^0$ and $c_2^1$ respectively. The values X and Y at the output from the elementary modules 525 are written in buffers 530 of $c_2^0$ and $c_1^1$ respectively. Obviously, the use of a temporal coding of the type (26),(27) or (28) would lead to writing in permuted buffers. In the case shown in FIG. 5, the values X, Y are written in the output buffers of $c_1^0, c_2^0$ and $c_2^1$ in the same order as components of vectors $a_1, a_2, a_3, a_4$ are written. On the other hand, writing into buffer 530 of $c_1^1$ takes place using addresses permuted by the cyclic permutation σ. According to one variant embodiment not shown, writing into the buffer of $c_1^1$ also takes place in the same order as the components of the vectors $a_1, a_2, a_3, a_4$ but reading takes place using addresses permuted by $\sigma^{-1}$. In both cases, the addressing means are designed to permute write or read addresses at the input or output of the buffer 530.

If there are any sign inversions in the matrix Ω, they may be taken into account by changing the sign of $\tilde{\alpha}$ and/or $\tilde{\beta}$ within the modules 525 related to the component(s) concerned.

The UWB signals transmitted by the system shown in FIG. 4 may be processed conventionally by a multi-antenna receiver. For example, the receiver may comprise a Rake type correlation stage followed by a decision stage, for example using a sphere decoder known to those skilled in the art.

The invention claimed is:

1. Space-time coding method for an ultra wide band (UWB) transmission system comprising two radiation elements, said method comprising the steps of:
    coding a block of information symbols ($S = (a_1, a_2, a_3, a_4)$) belonging to a pulse position modulation (PPM) modulation constellation or a pulse position modulation-pulse amplitude modulation (PPM-PAM) composite modulation constellation with a number of time positions greater than or equal to 3, into a sequence of vectors ($c_1^0, c_2^0, c_1^1, c_2^1$ the components of a vector being intended to modulate a UWB pulse signal for a radiation element of said system and for a given transmission interval ($T_f$),
    characterised in that a first and a second of said vectors are obtained by means of a first linear combination of a first and a second pair of said symbols,
    and in that a third and a fourth of said vectors are obtained by means of a second linear combination of said first and second pairs of said symbols, the first and the second linear combinations using scalar coefficients ($\tilde{\alpha}, \tilde{\beta}, -\tilde{\beta}, \tilde{\alpha}$), of which the corresponding ratios are approximately equal to the Golden number and to its opposite,
    the components of one of said vectors also being permuted according to a cyclic permutation prior to modulating said pulse UWB signal.

2. Method for transmitting a plurality of information symbols belonging to a PPM modulation constellation or a PPM-PAM composite modulation constellation having a number of time positions greater than or equal to 3,
    characterised in that said information symbols are coded using the space-time coding method according to one of the previous claims to supply said first, second, third, and fourth vectors,
    the components of each of these vectors modulating the position or the position and amplitude of pulses forming a pulse UWB signal to obtain four modulated pulse UWB signals, these four signals being transmitted by a first and a second radiation element during a first and a second transmission interval respectively.

3. Method according to claim 2 characterised in that said pulse UWB signal is a time hopping-UWB (TH-UWB) signal.

4. Method according to claim 2 characterised in that said pulse UWB signal is a direct sequence-UWB (DS-UWB) signal.

5. Method according to claim 2 characterised in that said pulse UWB signal is a TH-DS-UWB signal.

* * * * *